US008854637B2

(12) United States Patent
Kim et al.

(10) Patent No.: US 8,854,637 B2
(45) Date of Patent: Oct. 7, 2014

(54) HOST APPARATUS CONNECTED TO IMAGE FORMING APPARATUS AND SETTING INFORMATION MANAGEMENT METHOD THEREOF

(75) Inventors: Yong-jin Kim, Suwon-si (KR); Ju-won Min, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 291 days.

(21) Appl. No.: 12/855,021

(22) Filed: Aug. 12, 2010

(65) Prior Publication Data

US 2011/0134452 A1    Jun. 9, 2011

(30) Foreign Application Priority Data

Dec. 9, 2009    (KR) .................. 10-2009-0122021

(51) Int. Cl.
 G06F 3/12      (2006.01)
 H04L 12/24     (2006.01)
 H04L 29/08     (2006.01)

(52) U.S. Cl.
 CPC ............ G06F 3/1288 (2013.01); G06F 3/1231 (2013.01); G06F 3/1204 (2013.01); H04L 41/0846 (2013.01); H04L 67/34 (2013.01); H04L 41/22 (2013.01); H04L 41/0816 (2013.01); H04L 41/0213 (2013.01)
 USPC ........................................ 358/1.13; 358/1.15

(58) Field of Classification Search
 CPC ........................................ G06F 3/1204–3/1254
 USPC ................................................ 358/1.13, 1.15
 See application file for complete search history.

(56) References Cited

U.S. PATENT DOCUMENTS

| 2003/0231336 | A1* | 12/2003 | Kim ........................ 358/1.15 |
| 2007/0185979 | A1  | 8/2007  | Yoshida |
| 2008/0186524 | A1* | 8/2008  | Morimoto ............... 358/1.13 |
| 2008/0231914 | A1* | 9/2008  | Motoyoshi .............. 358/474 |
| 2009/0052348 | A1* | 2/2009  | Kato et al. .............. 370/254 |
| 2009/0106266 | A1  | 4/2009  | Donatelli et al. |
| 2009/0132779 | A1  | 5/2009  | Amaki et al. |
| 2009/0198802 | A1  | 8/2009  | Tanner et al. |

FOREIGN PATENT DOCUMENTS

JP    2007-200304    8/2007

* cited by examiner

*Primary Examiner* — Qian Yang
(74) *Attorney, Agent, or Firm* — Stanzione & Kim, LLP

(57) ABSTRACT

A setting information management method of a host apparatus which is communicatively coupled to a plurality of image forming apparatuses that include setting information, the method including selecting at least two image forming apparatuses, receiving at least one setting item and a setting value corresponding to the setting item of the setting information from the selected image forming apparatuses, displaying the at least one received setting item and setting value for each of the selected image forming apparatuses; comparing and displaying the at least one setting item and setting value of the selected image forming apparatuses according to a comparison option, selecting at least one of the displayed setting item and setting value to be updated, and changing at least one of the setting item and the setting value of at least one of the selected image forming apparatuses.

22 Claims, 11 Drawing Sheets

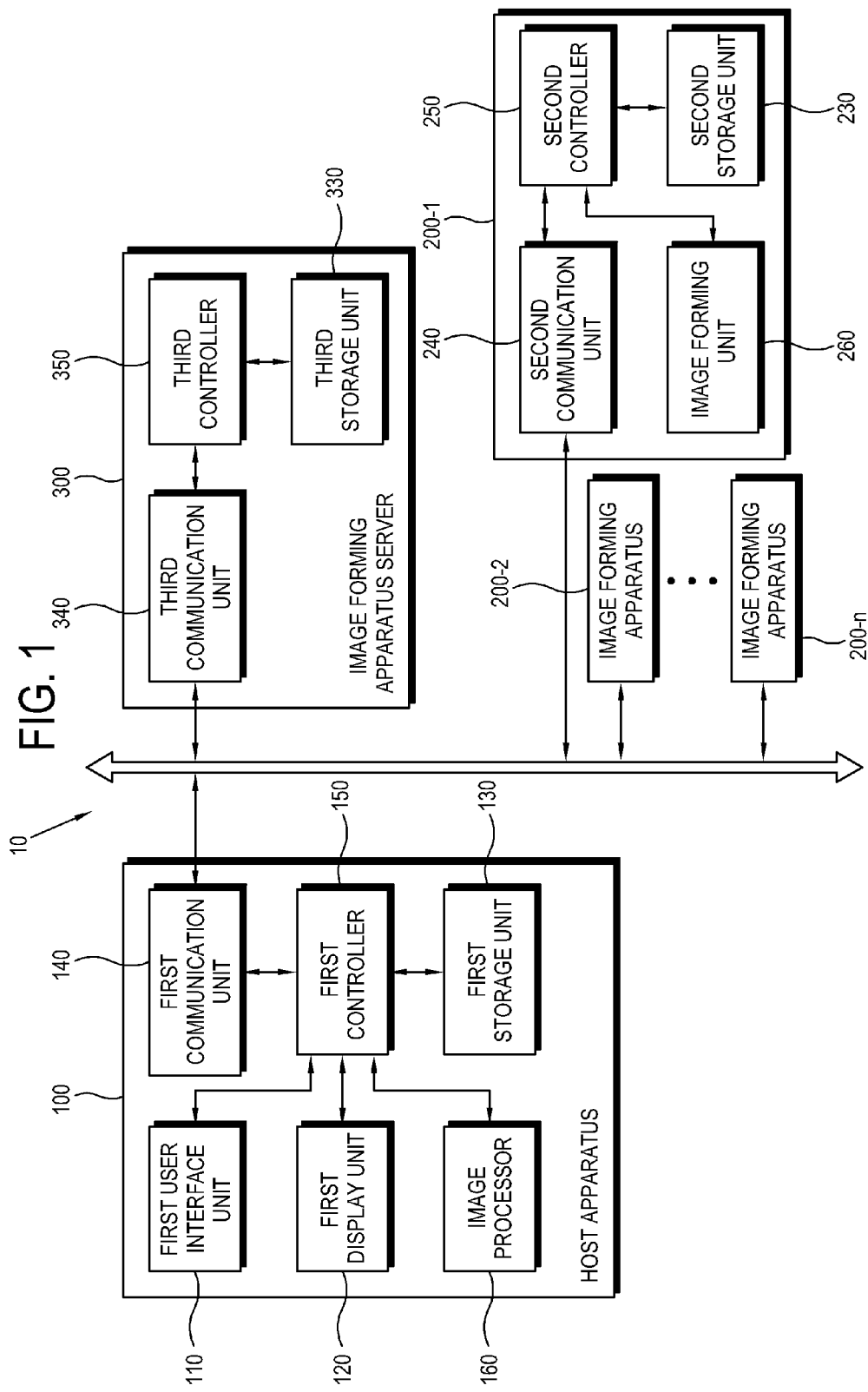

FIG. 2

[Configuration]

Printer Information

Total Page Count : 68368(impressions)
Firmware Version : OS 1.30.02.28 04-29-2008
Engine Version : 2.00.20
USB SN : BE65B1AQ200068H
PCL5E Version : PCL5e 5.76 04-08-2008
PCL6 Version : PCL6 5.72 04-02-2008
PS Version : PS3 1.79.76 03-27-2008
KSC5843 Version : KS/KSSM 5.03 12-21-2006
KSC5895 Version : KSC5895 5.04 12-21-2006
KSSM Version : KS/KSSM 5.03 12-21-2006
MP Tray Paper Size : No Paper
Tray1 Paper Size : A4
Service Date : 2008-10-9

Network Card

NIC Firmware Version : V4.03.04(ML-4050) 04-25-2008
MAC Address : 00:15:99:42:54:36
IP Address : 168.219.204.61
SubNet Mask : 255.255.255.0
Default Gateway : 168.219.204.1

Memory Information

Total Memory Size : 64 Mbytes
Bass Memory Size : 64 Mbytes

Installed Options

Cartridge Information

Toner Remaining : 49%(P6)
Page Count : 8602
Model ID : ML-D45508
Capacity : 20K
Supplier : SAMSUNG
Product Date : 2009.10
Serial-No : CRUM-09100775302

Usage Meter Count

Simplex Print Count : 68268(impressions)
                           68268(sheets)
Simplex Report Count : 95(impressions)
                           95(sheets)

FIG. 7

200-1 CLX-XXXX Series 10.88.xxx.xxx
200-2 SCX-XXXX Series 10.88.ooo.ooo

21 ☑  22 ☑

| 200-1 | 25 | 200-2 |
|---|---|---|
| 12 hour(s) | Clock Mode | ~~24 hour(s)~~ |
| 2009-08-28 11:24 | Date&Time | 2009-08-28 11:24 |
| ~~English~~ | Language | Korean |
| Auto | Emulation | Auto |
| 30 minute(s) | Power Save | 30 minute(s) |
| 120 minute(s) | Scan Power Save | 120 minute(s) |
| On | Toner Low Alert | On |
| 30 seconds | Machine Timeout | 30 seconds |
| 15 | Job Time out | 15 |
| Normal | Altitude adj | High1 |
| On | Auto Continue | On |
| ~~Long Edge~~ | ~~Duplex~~ | ~~N/A~~ |

23 UPDATE   24 CANCEL

📄 Machine Settings
📑 Machine Setup

SAME
DIFFERENT
NOT AVAILABLE

HOST APPARATUS CONNECTED TO IMAGE FORMING APPARATUS AND SETTING INFORMATION MANAGEMENT METHOD THEREOF

CROSS-REFERENCE TO RELATED APPLICATIONS

This application claims priority under 35 U.S.C. §119(a) from Korean Patent Application No. 10-2009-0122021, filed on Dec. 9, 2009 in the Korean Intellectual Property Office, the disclosure of which is incorporated herein in its entirety by reference.

BACKGROUND

1. Field of the Invention

Apparatuses and methods of the exemplary embodiments of the present general inventive concept relate to a host apparatus connected to an image forming apparatus and a setting information management method thereof, and more particularly, to a host apparatus and an information management method thereof which manages setting information of a plurality of image forming apparatuses connected thereto in a network.

2. Description of the Related Art

An image forming apparatus forms an image on a document. The image forming apparatus may include a printer, a photocopier, a facsimile, a multi-function device which has at least two functions, etc.

Recently, demand for an image forming apparatus as an office automation device performing not only a document print function but also a scanning function and a faxing function has increased. Accordingly, the image forming apparatus has been developed to provide extended functions with high performance.

To more efficiently manage an image forming apparatus connected in a network, a user (or administrator) manages various setting information of each device, i.e., an image forming apparatus by using a host apparatus such as a personal computer (PC).

The management method of the image forming apparatus includes (i) identifying and changing setting information of each image forming apparatus by accessing an internal Web server provided in the image forming apparatus; (ii) transmitting setting information through simple network management protocol (SNMP); (iii) using an integrated management solution of the image forming apparatus installed in the host apparatus; and (iv) uniformly applying setting information to the image forming apparatus by using an environment setting import/export function.

However, the method of using the Web server or the SNMP protocol requires a user to identify and change the setting information for each device, and thus the method is not efficient in managing a plurality of image forming apparatuses simultaneously.

Also, the method of using the integrated management solution or environment setting import/export function is mainly used when massive data are input simultaneously or the setting of a plurality of image forming apparatuses is synchronized. Thus, if the same setting information or different setting information exists for image forming apparatuses having different functions, a user may feel inconvenienced. Further, due to synchronization, particular setting information may be changed uniformly regardless of a user's intention.

SUMMARY

Accordingly, exemplary embodiments of the present general inventive concept provide a host apparatus and a setting information management method thereof which compares and displays setting information received from a host apparatus connected to a plurality of image forming apparatuses for each image forming apparatus, determines whether to update a setting value depending on a display result, and receives input to manage the setting information of the plurality of image forming apparatuses more conveniently.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing a setting information management method of a host apparatus which is communicatively coupled to a plurality of image forming apparatuses that include setting information, the method including selecting at least two image forming apparatuses out of the plurality of image forming apparatuses, receiving at least one setting item and a setting value corresponding to at least one the setting item of the setting information from the selected at least two image forming apparatuses, displaying the at least one received setting item and setting value for each of the selected at least two image forming apparatuses, comparing and displaying the at least one setting item and setting value of the selected at least two image forming apparatuses according to a comparison option, selecting at least one of the displayed at least one setting item and setting value to be updated, and changing at least one of the setting item and the setting value of at least one of the selected image forming apparatuses corresponding to the at least one selected setting item and setting value.

The comparison option may include at least one of a same, partially different, left exist only, right exist only, exist only in one of a comparison image forming apparatus, and not available.

At least one of the setting item and setting value of the selected at least two image forming apparatuses may be separately displayed according to the comparison option.

The selecting at least one of the setting item and setting value may include selecting at least one of the setting item and setting value by a received drag and drop input.

One of the selected at least two image forming apparatuses may be included in an image forming apparatus group having at least one image forming apparatus.

The comparing and displaying may include not displaying a setting item and a setting value which are the same between the at least two selected image forming apparatuses.

The comparing and displaying may include separately displaying at least one of the setting item and the setting value according to an update availability of the setting value.

The method may further include logging in by a user, wherein the displaying for each of the image forming apparatuses may include displaying a setting item and a setting value corresponding to a level of a user who logs in.

The method may further include storing setting information which includes at least one of the changed setting item and setting value, and transmitting the stored setting information to a corresponding image forming apparatus of the selected at least two image forming apparatuses.

The transmitting the setting information may include transmitting the setting information by using at least one of a simple network management protocol (SNMP), a comma separated value (CSV) file, and an extensible markup language (XML) file.

The selecting the at least two image forming apparatuses may include selecting a reference image forming apparatus and at least one comparison image forming apparatus, and the changing may include updating at least one of a setting item and a setting value of the reference image forming apparatus to the comparison image forming apparatus.

The setting information may include at least one of an address book, setting information on a function of the image forming apparatus, network settings information, and security setting information.

Exemplary embodiments of the present general inventive concept may also be achieved by providing a host apparatus which is communicatively coupled to a plurality of image forming apparatuses that include setting information, the host apparatus including a user interface unit to select at least two image forming apparatuses out of the plurality of image forming apparatuses and selects at least one of a setting item and a setting value of setting information of the selected at least two image forming apparatuses, a communication unit to communicate with the plurality of image forming apparatuses and receives at least one setting item and at least one setting value corresponding to the setting item from the selected at least two image forming apparatuses, a display unit to display thereon at least one received setting item and the setting value for each of the selected image forming apparatuses, and a controller to control the display unit to compare and display thereon at least one setting item and at least one setting value of the selected at least two image forming apparatuses according to a comparison option, to receive a selection of the displayed setting item and setting value to be updated through the user interface unit according to the display result, and to control the communication unit to transmit a command to change at least one of the setting item and setting value of at least one of the selected at least two image forming apparatuses corresponding to the at least one selected setting item and setting value.

The comparison option may include at least one of a same, partially different, left exist only, right exist only, exist only in one of a comparison image forming apparatus, and not available.

The display unit may separately display thereon at least one of the setting item and setting value of the selected at least two image forming apparatuses according to the comparison option.

The user interface unit may receive a selection of at least one of the setting item and setting value by a received drag and drop input.

One of the at least two selected image forming apparatuses may be included in an image forming apparatus group including at least one image forming apparatus.

The display unit may not display thereon a setting item and a setting value which are the same between the at least two selected image forming apparatuses.

The display unit may separately display thereon at least one of the setting item and setting value depending on an update availability of the setting value.

The user interface unit may receive an input of an ID and password for a user log-in, and the controller may determine a level of a user who logs in, and control the display unit to display thereon a setting item and a setting value corresponding to the determined user level.

Exemplary embodiments of the present general inventive concept may also provide a method of managing setting information of a plurality of image forming apparatuses with a host apparatus, the method including comparing at least selected setting information of the plurality of image forming apparatuses, updating the setting information according to at least the comparison of the setting information of the plurality of image forming apparatuses, and displaying the updated setting information with a display of the host apparatus.

Exemplary embodiments of the present general inventive concept may also provide an apparatus to manage setting information of a plurality of image forming apparatuses, the apparatus including a controller to compare at least selected setting information of the plurality of image forming apparatuses, and to updating the setting information according to at least the comparison of the setting information of the plurality of image forming apparatuses, and a display unit to display the updated setting information.

Exemplary embodiments of the present general inventive concept may also provide a host apparatus communicatively coupled to a plurality of image forming apparatuses that include setting information, the host apparatus including an interface unit to receiving a selection of two image forming apparatuses from the plurality of image forming apparatuses, and to receive at least one setting item and a setting value corresponding to the setting information from the selected two image forming apparatuses, and a controller to compare the at least one setting item and setting value of the selected two image forming apparatuses, and to change at least one of the setting item and the setting value of at least one of the selected two image forming apparatuses.

The host apparatus may also include a display to display the changed setting item and setting value of the at least one of the selected two image forming apparatuses.

Exemplary embodiments of the present general inventive concept may also provide a method of managing setting information of a host apparatus which is communicatively coupled to a plurality of image forming apparatuses that include setting information, the method including receiving a selection of two image forming apparatuses from the plurality of image forming apparatuses, receiving at least one setting item and a setting value corresponding to the setting information from the selected two image forming apparatuses, comparing the at least one setting item and setting value of the selected two image forming apparatuses, receiving a selection of at least one setting item and setting value determined by the comparison to be updated according to the comparison, and changing at least one of the setting item and the setting value of at least one of the selected two image forming apparatuses.

The method may also include displaying the result of the comparing the at least one setting item and setting value of the selected two image forming apparatuses with a display coupled to the host apparatus.

The method may also include displaying the changed at least one of the setting item and the setting value of at least one of the selected two image forming apparatuses.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

FIG. 1 is a block diagram illustrating a host apparatus and an image forming system including the same according to exemplary embodiments of the present general inventive concept;

FIGS. 2 and 3 illustrate examples of setting information according to exemplary embodiments of the present general inventive concept;

FIGS. 6 and 7 illustrate examples of a setting screen 20 according to exemplary embodiments of the present general inventive concept;

DETAILED DESCRIPTION OF THE EMBODIMENTS

Figure 3:
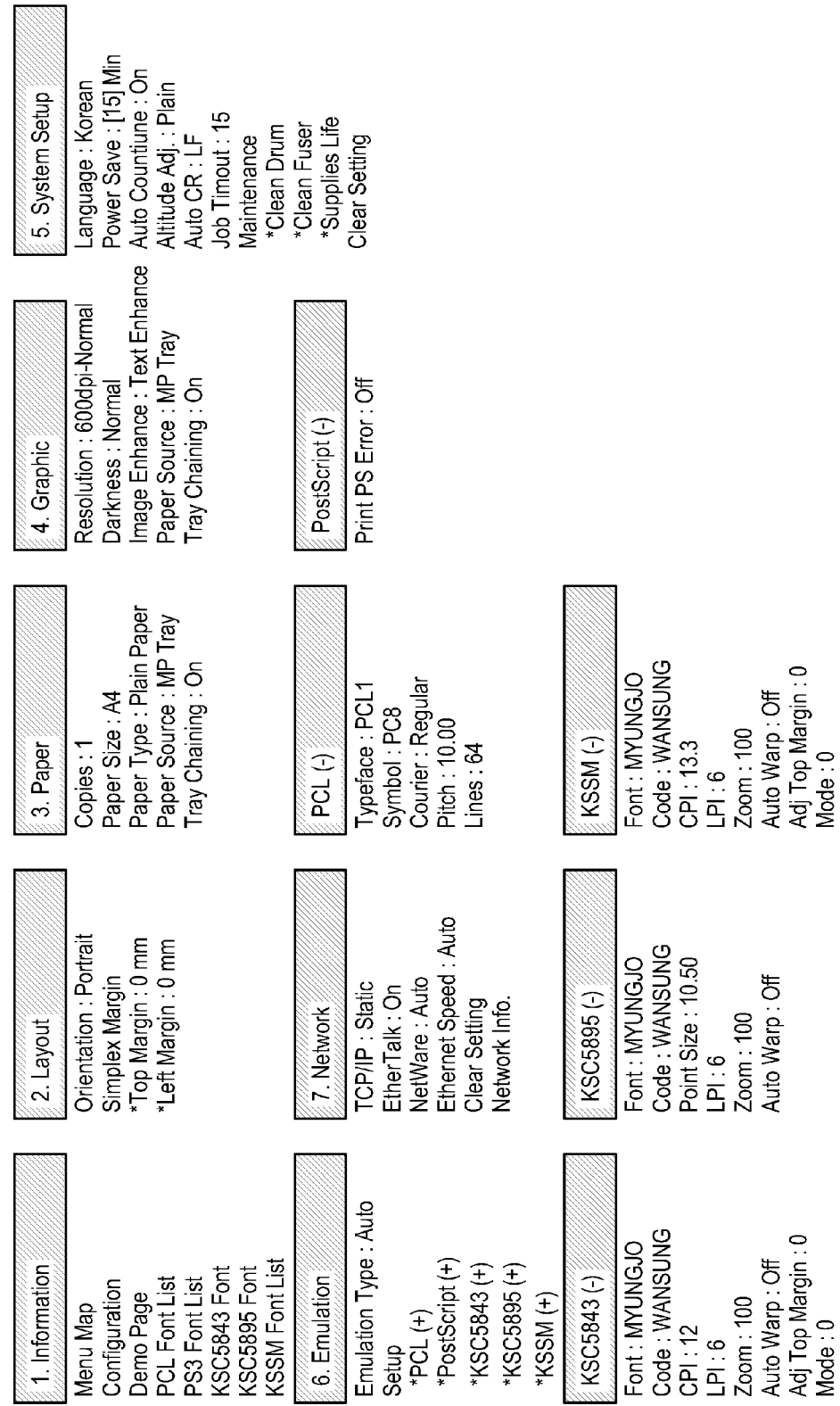

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. The embodiments are described below in order to explain the present general inventive concept by referring to the figures.

FIG. 1 is a block diagram illustrating an image forming system 10 which includes a host apparatus 100 according to exemplary embodiments of the present general inventive concept.

As illustrated therein, the image forming system 10 according to the present general inventive concept may include the host apparatus 100, a plurality of image forming apparatuses 200-1, 200-2, . . . , and 200-n, and an image forming apparatus server 300. The image forming apparatus server 300 may be provided separately, included in the host apparatus 100 or omitted.

According to exemplary embodiments of the present general inventive concept, if the image forming apparatus server 300 is omitted or included in the host apparatus 100, the host apparatus 100 can be communicatively coupled to the plurality of the image forming apparatuses 200-1, 200-2, . . . and 200-n to receive setting information therefrom. If the host apparatus 100 includes the image forming apparatus server 300, the host apparatus 100 may have a function of managing the plurality of image forming apparatuses 200-1, 200-2, . . . and 200-n. The host apparatus 100, the plurality of image forming apparatuses 200-1, 200-2, . . . and 200-n, and the image forming apparatus server 300 may be communicatively coupled to one another via a wired and/or wireless communication network.

If the image forming apparatus server 300 is separately provided, the image forming apparatus server 300 can receive and store setting information from at least one of the plurality image forming apparatuses 200-1, 200-2, . . . and 200-n, and the host apparatus 100 can receive the setting information from the image forming apparatus server 300.

The host apparatus 100 can include a personal computer (PC), server, tablet computer, smartphone, processor, and/or any other suitable apparatus to carry out the exemplary embodiments of the present general inventive concept as disclosed herein. The image forming apparatuses 200-1, 200-2, . . . , and 200-n can include a printer or a multi-function device performing at least two functions. The image forming apparatuses 200-1, 200-2, . . . , and 200-n may be connected and/or communicatively coupled in a network, by a local connection, in parallel, or by UNC (Uniform Naming Convention or Universal Naming Convention), and can include an image forming unit 260 performing a print operation according to a print command.

The print operation can include a print operation to copy a scanned document, a print operation to receive and print fax data, and a print operation to print data received by the host apparatus 100 (e.g., from the outside from an apparatus coupled to the wired and/or wireless communication network) including a server or print data stored within (e.g., data stored on a hard disk drive or other storage device) or outside (e.g., data stored on a USB memory stick) of the image forming apparatuses 200-1, 200-2, . . . and 200-n.

The image forming apparatuses 200-1, 200-2 . . . and 200-n according to the present general inventive concept may be connected and/or communicatively coupled to the host apparatus 100 by a local connection or shared as a network image forming apparatus having their own IP addresses assigned in a network.

If the image forming apparatuses 200-1, 200-2, . . . and 200-n are connected and/or communicatively coupled by a local connection to the host apparatus 100, the host apparatus 100 can include the image forming apparatus server 300.

If the image forming apparatuses 200-1, 200-2, . . . and 200-n are network image forming apparatuses, the image forming apparatus server 300 can be provided separately to manage the plurality of the image forming apparatuses 200-1, 200-2, . . . and 200-n. The host apparatus 100 may receive information from at least one of the plurality of the image forming apparatuses 200-1, 200-2, . . . and 200-n from the image forming apparatus server 300.

According to exemplary embodiments of the present general inventive concept, an application which operates as an integrated application program can be installed in the host apparatus 100 to receive, manage, and change setting information from the plurality of the image forming apparatuses 200-1, 200-2, . . . and 200-n.

A user may execute the application installed in the host apparatus 100, perform a log-in process by inputting a user ID and password, and use the executed application. A user according to the present general inventive concept can include an administrator.

As illustrated in FIG. 1, the host apparatus 100 can include a first user interface unit 110, a first display unit 120, a first storage unit 130, a first communication unit 140, a first controller 150, and an image processor 160.

The first user interface unit 110 receives one or more commands (e.g., receive input from a user).

The first user interface unit 110 can receive a user's command to select at least two of the image forming apparatuses 200-1, 200-2, . . . and 200-n to compare setting information and to select whether to change the setting information of at least one of the selected image forming apparatuses. The setting information can include at least one setting item and a setting value for the setting item.

The first controller 150 may update and change a setting value of one of the image forming apparatuses according to a selection received from the first user interface 110 with respect to another image forming apparatus.

A user may perform the log-in process to manage the setting information of the plurality of image forming apparatuses 200-1, 200-2, . . . and 200-n through the first user interface unit 110. A user may perform an administrator log-in process in which setting and change of at least a portion of and/or all of the environments (e.g., the settings, configurations, and/or connections of the image forming apparatuses 200-1, 200-2, . . . and 200-n) of the image forming apparatuses 200-1, 200-2, . . . and 200-n is available without an additional access limit.

The first user interface unit 110 can receive a user's input with respect to an administrator's ID and password to log in the administrator mode. The first controller 150 can certify a user as a system administrator using the received input administrator ID and password. That is, the first controller 150 compares the received username and password input by the user, and compares it to a predetermined (e.g., stored) administrator username and password, and if the inputted username and password match the predetermined username and password, the first controller 150 certifies the user as a system administrator. According to the present general inventive concept, a user includes an administrator.

The host apparatus 100 according to the present general inventive concept may determine a level of a user who logs in (e.g., determine whether it is a general user or administrator), and display on the first display unit 120 at least one setting item and at least one setting value (e.g., setting items and setting value of the image forming apparatuses 200-1, 200-2, . . . and 200-n, the image forming apparatus server 300, and/or any other suitable settings for the image forming system 10 according to exemplary embodiments of the present general inventive concept) according to the determined level of a user. When an administrator log-in is determined, the host apparatus 100 may display setting values for one or more setting items (e.g., all setting items). When a general user log-in is determined, the host apparatus 100 may display a setting item not affecting the system (e.g., address, etc.) and a corresponding setting value.

The first user interface unit 110 may receive a user's command to execute the application (e.g., installed on the host apparatus 100) to manage and/or control the plurality of image forming apparatuses 200-1, 200-2, . . . and 200-n.

The first user interface unit 110 may include a keyboard and/or a mouse provided as an input device of the host apparatus 100, and a graphic user interface (GUI) (hereinafter, to be also called a UI) which is generated by an execution of a driver and/or an additional application and displayed on the first display unit 120 to receive a user's input. The GUI according to the present general inventive concept can include at least one icon, button, or text input window to be selected by a user.

Figure 5:
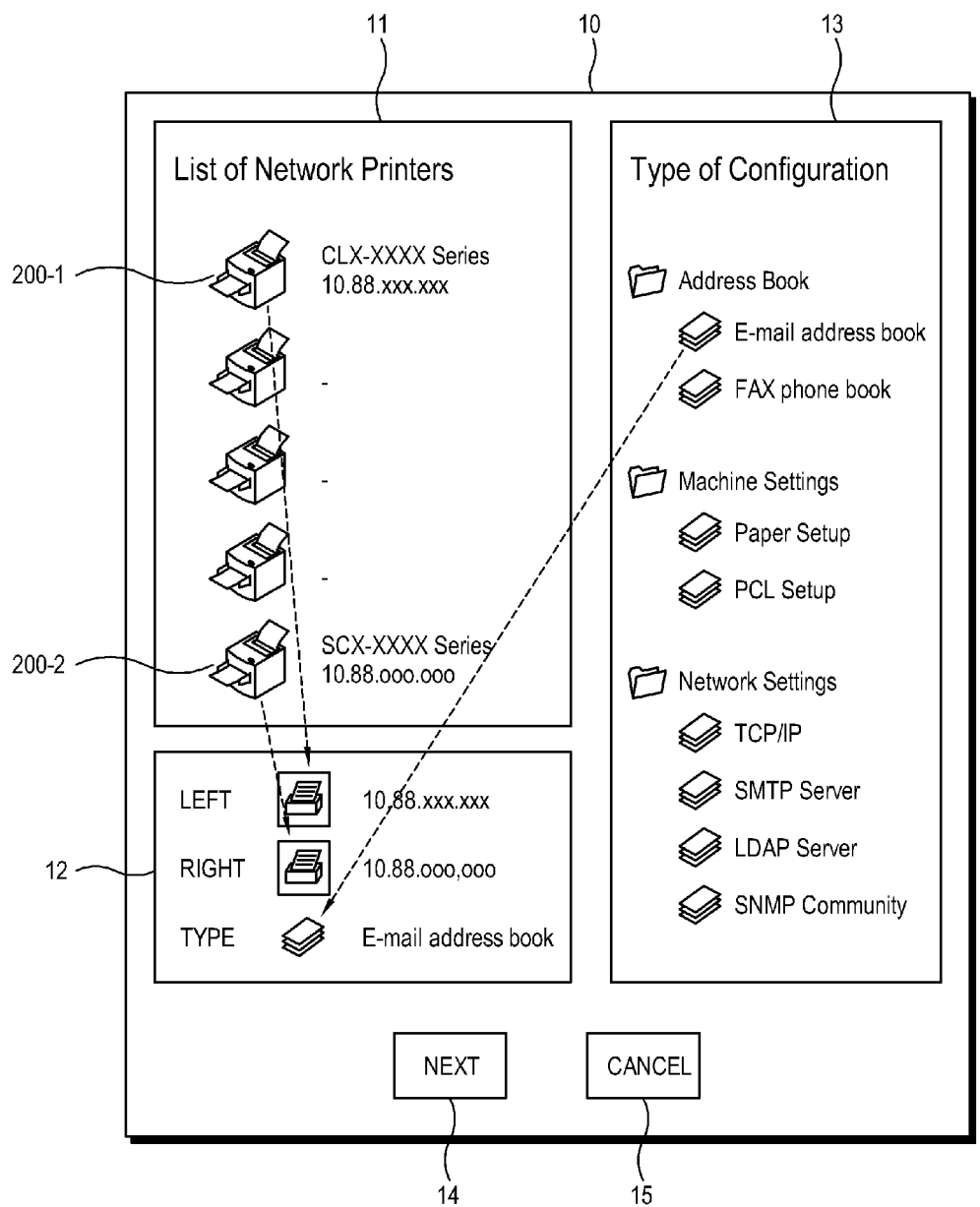
FIG. 5 illustrates a management screen of a plurality of image forming apparatuses according to exemplary embodiments of the present general inventive concept.
Figure 6:
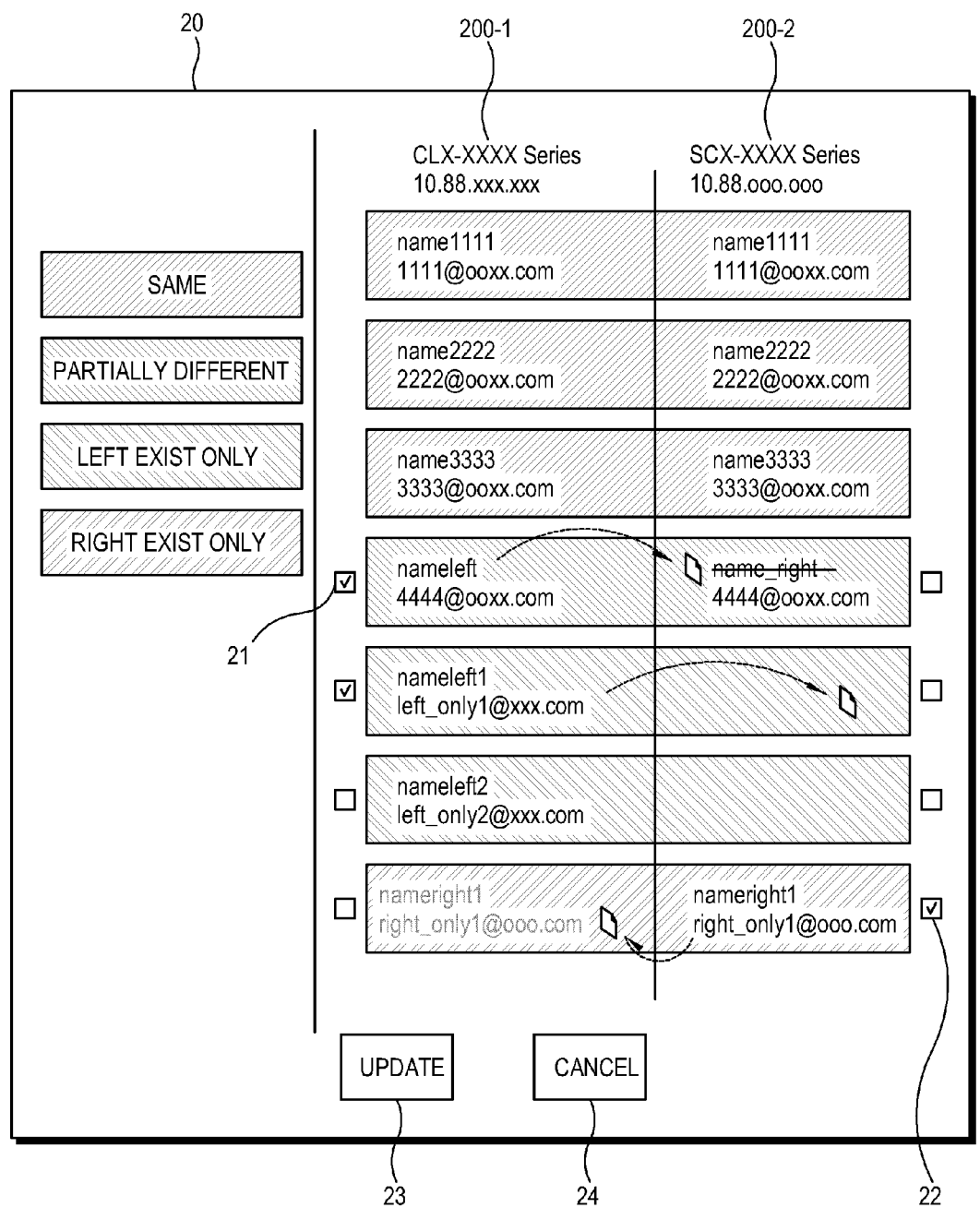

If the first user interface unit 110 can include a GUI, the host apparatus 100 can receive one or more commands from a user corresponding to a management screen 10 (e.g., as illustrated in FIG. 5) and a setting screen 20 (e.g., as illustrated in FIG. 6) displayed on the first display unit 120.

The first display unit 120 can display thereon the management screen 20 of the plurality of image forming apparatuses 200-1, 200-2, . . . and 200-n which is connected and/or communicatively coupled to the host apparatus 100, and the setting screen 20 of the at least two selected image forming apparatuses. The first display unit 120 may include a liquid crystal display (LCD), light emitting diode (LED) display, organic light emitting diode (OLED) display, or any other suitable display, and a driver (not illustrated) to drive the LCD, LED display, OLED display, or other suitable display.

The first storage unit 130 can store therein the setting information received from at least one of the plurality of image forming apparatuses 200-1, 200-2, . . . and 200-n. The setting information can include at least one of an address book, setting information for a function and/or operation supported by the image forming apparatus, network setting information, and security setting information.

FIGS. 2 and 3 illustrate examples of the setting information according to exemplary embodiments of the present general inventive concept.

As illustrated therein, the setting information can include one or more setting items and/or setting values included in a configuration (e.g., configuration options of image forming system 10) as illustrated in FIG. 2 or a menu map as in FIG. 3 for one or more functions and/or operations supported by the image forming apparatus.

The network setting information includes one or more setting items and setting values in relation to an assignment of IP address to the image forming apparatus. For example, the network setting information may include a subnet mask, a gateway address, a domain name and an enabling of an IPv6 protocol. The security setting information may include authentication information according to a user's account of the image forming apparatus (e.g., local authentication, Kerberos, SMB, and LDAP, etc.), to provide a guest account and to provide a logoff reminder.

The first storage unit 130 may include an internal or external storage module such as a hard disk drive (HDD), a solid state drive (SSD), a flash memory, an/or any other suitable memory device to carry out the exemplary embodiments of the present general inventive concept as disclosed herein. User information can be stored in the first storage unit 130 of the host apparatus 100 according to the present general inventive concept may include authentication information for a user more and/or administrator mode.

The first communication unit 140 can communicate with the plurality of image forming apparatuses 200-1, 200-2, . . . and 200-n, and can receive the setting information, i.e., at least one setting item and a corresponding setting value from at least one of the plurality of image forming apparatuses 200-1, 200-2, . . . and 200-n. The received setting information can be stored in the first storage unit 130.

The first communication unit 140 may selectively receive setting information of at least two image forming apparatuses selected from the plurality of image forming apparatuses 200-1, 200-2, . . . and 200-n.

If the application is executed to manage at least one of the plurality of image forming apparatuses 200-1, 200-2, . . . and 200-n, the first controller 150 may control the first communication unit 140 to receive the setting information of at least one of the plurality of image forming apparatuses 200-1, 200-2, . . . and 200-n (e.g., from the outside), and store the received setting information in the first storage unit 130.

The first communication unit 140 may receive the setting information directly from at least one of the plurality of image forming apparatuses 200-1, 200-2, . . . and 200-n connected and/or communicatively coupled thereto or from the image forming apparatus server 300 storing therein the setting information of the image forming apparatuses.

The first communication unit 140 can communicate with at least one of the plurality of image forming apparatuses 200-1, 200-2, . . . and 200-n and the image forming apparatus server 300. The first communication unit 140 may include a wired and/or wireless communication module connected and/or communicatively coupled to at least one of the plurality of image forming apparatuses 200-1, 200-2, . . . and 200-n or the image forming apparatus server 300 by a local connection or by a wired and/or wireless communication network through a predetermined protocol.

The first communication unit 140 may include a communication module which can communicate with the plurality of image forming apparatuses 200-1, 200-2, . . . and 200-n by a protocol such as Hyper Text Transfer Protocol (HTTP), Simple Network Management Protocol (SNMP), and/or any suitable communication protocol to carry out the exemplary embodiments of the present general inventive concept as disclosed herein.

The first controller 150 can control the host apparatus 100. The first controller 150 may include software and/or firmware such as the application managing the plurality of image forming apparatuses 200-1, 200-2, . . . and 200-n. The first controller 150 may be incorporated with hardware such as a central processing unit (CPU).

Figure 4:
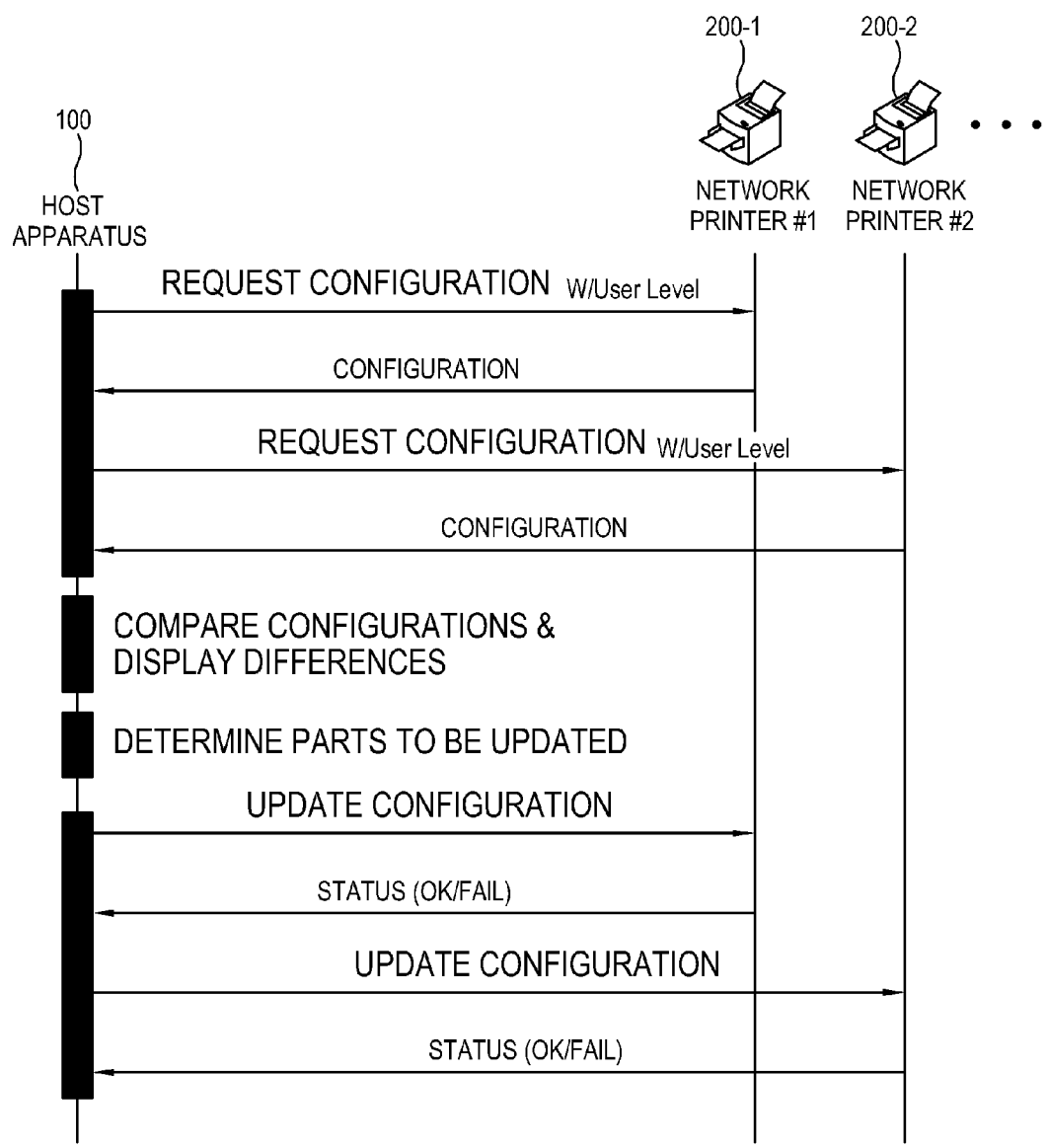
FIG. 4 illustrates a control operation according to exemplary embodiments of the present general inventive concept.

FIG. 4 illustrates a control operation according to exemplary embodiments of the present general inventive concept.

The host apparatus 100 according to the present general inventive concept can select two of the plurality of image forming apparatuses 200-1, 200-2, . . . and 200-n, compare setting information of the two selected image forming apparatuses and update the setting value of one of the image forming apparatuses to the other one of the image forming apparatuses.

More specifically, as illustrated in FIG. 4, the first controller 150 can perform a request configuration and a configuration with respect to at least one setting item and a corresponding setting value for a first image forming apparatus 200-1 and a second image forming apparatus 200-2.

The first controller 150 may receive the setting item and the setting value corresponding to the level of a user (e.g., general user, administrator, etc.) who logs in the host apparatus 100.

The first controller 150 may control the first display unit 120 to display thereon the management screen 10 including a list of the plurality of image forming apparatuses 200-1, 200-2, . . . and 200-n and a setting item list.

FIG. 5 illustrates the management screen 10 of at least one of the plurality of image forming apparatuses 200-1, 200-2, . . . and 200-n according to exemplary embodiments of the present general inventive concept.

As illustrated therein, the management screen 10 which can be displayed on the first display unit 120 can include a device area 11 to display the list of the plurality of image forming apparatuses 200-1, 200-2, . . . and 200-n, an item area 12 to display a manageable setting item list, a management area 13 to display the image forming apparatus selected by a user and the setting item, a next button 14, and a cancel button 15, and any other suitable information to carry out the exemplary embodiments of the present general inventive concept.

The device area 11 can display therein at least one of the plurality of connectable image forming apparatuses 200-1, 200-2, . . . and 200-n.

The item area 12 can display therein the setting item list which can be managed by a user. The displayed setting item may include an address book, machine settings for functions supported by the image forming apparatus, and network settings of the image forming apparatus.

A user may select two image forming apparatuses, i.e., the first and second image forming apparatuses 200-1 and 200-2, from the list of the plurality of image forming apparatuses displayed on the device area 11 through the first user interface unit 110 and display the first and second image forming apparatuses 200-1 and 200-2 on the management area 13.

A user may select the first and second image forming apparatuses 200-1 and 200-2 by a drag and drop operation, or a selection of a right button of a mouse, or any other suitable user interface input selection to carry out the exemplary embodiments of the present general inventive concept as disclosed herein.

Likewise, a user may select a setting item, e.g. an address book from the setting item list of the item area 12 and display the address book on the management area 13.

If the selection of the two image forming apparatuses of which the setting information is compared, and the selection of the setting item are completed, a user may select the next button 14 of the management screen 10 and compare the setting value of the selected setting item for each image forming apparatus.

The first controller 150 can control the first display unit 120 to display thereon the setting screen 20 as in FIG. 4 or 5 corresponding to a user's selection of the next button 14.

FIGS. 6 and 7 illustrate examples of the setting screen 20 according to exemplary embodiments of the present general inventive concept.

If the address book is selected as the setting item in FIG. 5, the first controller 150 may display the setting screen 20 as in FIG. 6.

As illustrated therein, the setting screen 20 can separately display each setting value, i.e., address book information received from the first and second image forming apparatuses 200-1 and 200-2 according to a comparison option. For example, the setting screen 20 may display the first and second image forming apparatuses 200-1 and 200-2 in a left area and a right area, respectively.

As illustrated in FIG. 4, the first controller 150 can compare configurations received from the first and second image forming apparatuses 200-1 and 200-2, respectively, and can control the first display unit 120 to display a difference of the configurations according to the comparison result.

The first display unit 120 may separately display thereon the setting value according to the comparison option selectable from the setting screen 20 in FIG. 4. The comparison option may include at least one of "same", "partially different", "left exist only", "right exist only", "exist only" in one of the first and second image forming apparatuses 200-1 and 200-2, and "not available".

For example, the first display unit 120 may separately display at least one of a background color of an area corresponding to at least one of the setting item and the setting value, and a font, font size, and font color of the field according to the comparison option, or display an icon for separation in a side of the field.

More specifically, referring to FIG. 4, the setting screen 20 may separately display the cases when the first and second image forming apparatuses 200-1 and 200-2 have the same value for particular address book information, when the first and second image forming apparatuses 200-1 and 200-2 have different values for particular address book information, and when one of the first and second image forming apparatuses 200-1 and 200-2 does not have the setting value.

The case when one of the first and second image forming apparatuses 200-1 and 200-2 does not have the setting value can include the "left exist only" and the "right exist only".

If the first and second image forming apparatuses 200-1 and 200-2 have the same setting value, the setting item and setting value may not be displayed on the setting screen 20.

The setting screen 20 can be a UI through which a user may select whether to update the setting value of the image forming apparatus. The setting screen 20 can include a left check box 21, a right check box 22, an update button 23, and a cancel button 24.

A user may change the address book information of the first image forming apparatus 200-1 and/or the second image forming apparatus 200-2, i.e., determine parts to be updated as in FIG. 2 through the UI of the setting screen 20 in FIG. 4.

For example, if the first and second image forming apparatuses 200-1 and 200-2 have different names, i.e. name_left and name_right with respect to the same mail address (e.g., electronic mail address and/or communication network address) 4444@oxx.com, a user may select the left check box 21 and apply the name_left, the name of the first image forming apparatus 200-1, to the second image forming apparatus 200-2.

Likewise, with respect to a mail address stored in the first image forming apparatus 200-1 such as left only1@xxx.com stored as nameleft1, a user may select the left check bock 21 and add the nameleft1 to the second image forming apparatus 200-2.

With respect to a mail address stored n the second image forming apparatus 200-2 such as right only1@ooo.com stored as namright1, a user may select the right check box 22 and add the nameright1 to the first image forming apparatus 200-1.

If the update of the address book information is determined according to the selection of the left and right check boxes 21 and 22, a user may select the update button 23, and update the setting value, i.e., the address book information of the first and second image forming apparatuses 200-1 and 200-2.

A user may determine whether to change the setting value for the setting item (e.g., by manipulating a mouse such as in a drag and drop operation) as well as by selecting the check box. For example, the setting value left only1@xxx.com of the first image forming apparatus 200-1 corresponding to nameleft1 may be moved to the right area of the second image forming apparatus 200-1 (e.g., by a drag and drop operation) to add nameleft1 to the second image forming apparatus 200-2.

The first controller 150 can control the first communication unit 140 to update configuration with respect to the first and second image forming apparatuses 200-1 and 200-2 illustrated in FIG. 2 corresponding to a received update configuration command (e.g., according to a user's selection).

The first communication unit 140 may transmit the setting value to a corresponding image forming apparatus through a protocol such as SNMP or a file such as CSV and XML.

If it is determined (e.g., if a user determines) to update the setting value for a plurality of setting items, the first controller 150 can update the setting value uniformly by transmitting the setting value corresponding to the plurality of setting items to the image forming apparatus simultaneously, and update the plurality of image forming apparatuses (e.g., the first and second image forming apparatuses 200-1 and 200-2).

The first controller 150 can receive status information (e.g., the update) from the first and second image forming apparatuses 200-1 and 200-2 through the first communication unit 140. The status information may include data acknowledging the installation of the update or notifying of the failure of the update.

The first controller 150 may control the first display unit 120 to notify a user of the update result through a text or graphic.

If a user selects the machine settings for the function of the image forming apparatus in FIG. 3, the first controller 150 may display the setting screen 20 as illustrated in FIG. 5.

As illustrated therein, the setting screen 20 can separately display each setting value, i.e. machine settings information received from the first and second image forming apparatuses 200-1 and 200-2 according to the comparison option. The setting screen 20 may separately display the setting values of the first and second image forming apparatuses 200-1 and 200-2 in the left area and the right area, respectively.

Referring to FIG. 5, the setting screen 20 can separately display when the first and second image forming apparatuses 200-1 and 200-2 have the same setting value, when the first and second image forming apparatuses 200-1 and 200-2 have different setting values, and when one of the first and second image forming apparatuses 200-1 and 2002 does not have the setting value for the machine settings information item. When one of the first and second image forming apparatuses 200-1 and 200-2 does not have the setting value can include the left exist only and right exist only.

If the first and second image forming apparatuses 200-1 and 200-2 have the same setting value, the setting item and the setting value may not be displayed on the setting screen 20.

Depending on the level (e.g., general user, administrator, etc.) of a user who logs in, the displayed setting item and setting value may be limited. If a general user login in confirmed, a setting item which can affect a performance of the system (e.g., image forming system 10) may not be displayed or may be disabled so as not to be changeable by a user even if displayed on the setting screen 20. The disabled setting item may not available among the comparison options.

The setting screen 20 of a UI can include a left check box 21, a right check box 22, an update button 23, and a cancel button 24 to select whether to update the setting value of the image forming apparatus.

It can be determined (e.g., a user may determine) whether to change, i.e. update the setting value of the first image forming apparatus 200-1 or the second image forming apparatus 200-2 through the UI of the setting screen 20 illustrated in FIG. 7. Setting values 25 of the setting screen 20 can include, for example, at least one of a clock mode, date and time, language, emulation, power save, scan power save, toner low alert, machine timeout, job timeout, altitude adjustment, auto continue, and duplex, and any other suitable setting value that may carry out the exemplary embodiments of the present general inventive concept as disclosed herein.

For example, if setting values 25 for a clock mode to set date and time are 12 hours and 24 hours for the first and second image forming apparatuses 200-1 and 200-2, respectively, a user may select the left check box 21 and apply 12 hours, a setting value of the first image forming apparatus 200-1, to the second image forming apparatus 200-2, i.e., change the setting value of the second image forming apparatus 200-2.

Likewise, if setting values 25 of a language setting item are English and Korean for the first and second image forming apparatuses 200-1 and 200-2, respectively, a user may select the right check box 22 to apply Korean (e.g., a setting value of the second image forming apparatus 200-2) to the first image forming apparatus 200-1, i.e., change the setting value of the first image forming apparatus 200-1. A user may change the setting value (e.g., by manipulating a mouse by a drag and drop operation as well as by selecting the check box).

If setting values 25 of an auto continue setting item are on and off for the first and second image forming apparatuses 200-1 and 200-2, respectively, a user may select not to change the setting value.

That is, a user may immediately determine whether the setting values are the same through the setting screen 20, and select whether to update the setting value. Alternatively, the host apparatus 100 may determine whether the setting values are the same, and update at least one setting value according to the determination. That is, the host apparatus may update at least one setting value if it is determined that the setting values are not the same.

The setting screen 20 may separately display whether the image forming apparatus supports a function such as a setting item duplex, i.e., whether an update is available. That is, if the setting value is not changed due to functional difference between device models, the setting screen 20 may disable the left and right check boxes 21 and 22. If the setting item includes the network settings, the setting screen 20 may disable an IP address item whose change is limited.

As disclosed above, if the change of the setting value is selected by the selection of the left and right check boxes 21 and 22, a user may select the update button 23 and update the setting value of the first and second image forming apparatuses 200-1 and 200-2.

The first controller 150 may control the first communication unit 140 to transmit the setting value to the image forming apparatus by a protocol such as SNMP or through a file such as comma separated value (CSV) and extensible markup language (XML).

The first controller 150 may receive status information representing the update result (e.g., the update is complete (i.e., "OK") or the update has failed (i.e., "Fail")) from the first and second image forming apparatuses 200-1 and 200-2 through the first communication unit 140, and may control the first display unit 120 to display the received update result.

Figure 8:
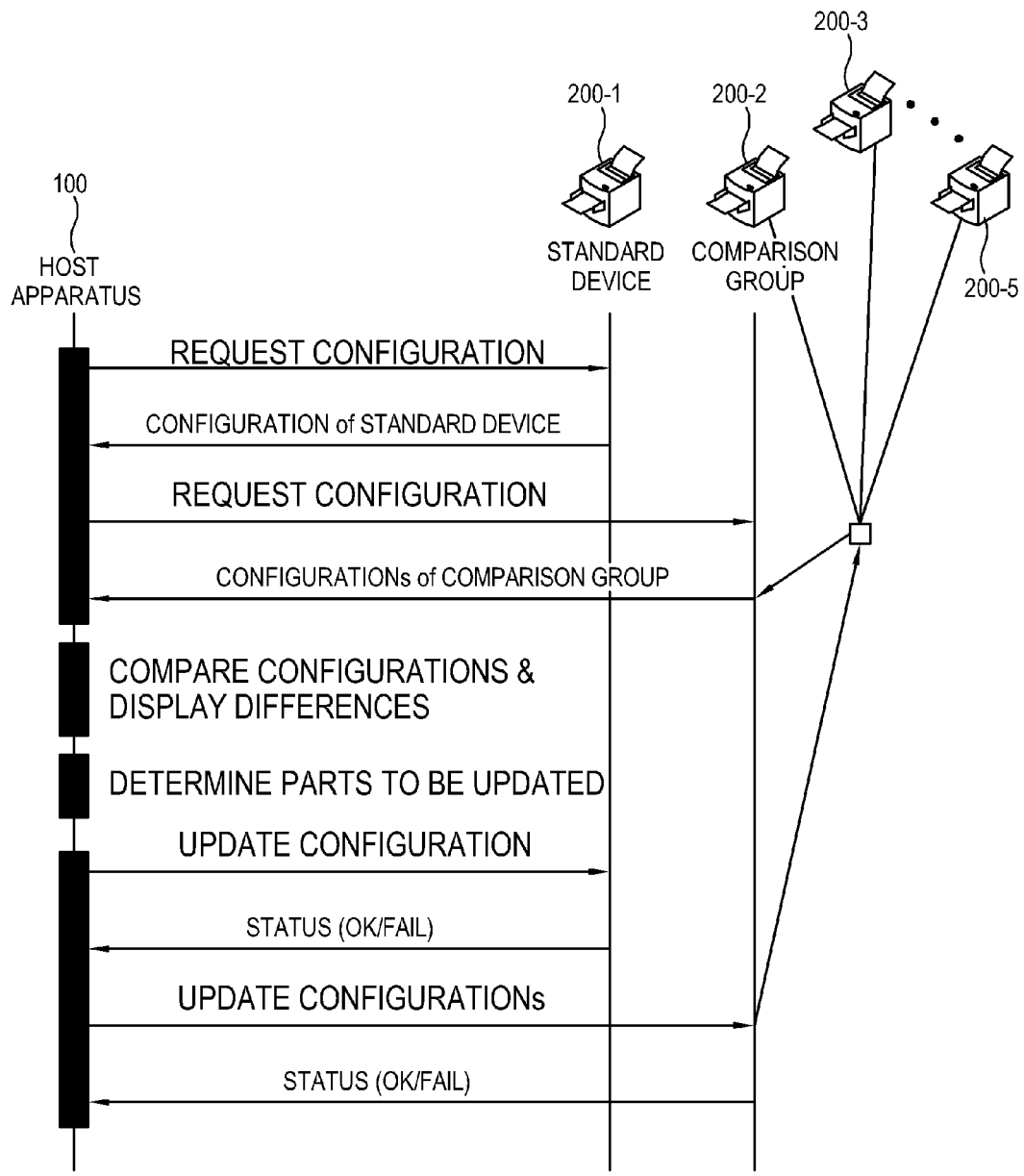
FIG. 8 illustrates a control operation according to exemplary embodiments of the present general inventive concept.

According to exemplary embodiments of the present general inventive concept, the host apparatus 100 may select at least three of the plurality of image forming apparatuses 200-1, 200-2, . . . and 200-n (e.g., as illustrated in FIG. 8), select a reference image forming apparatus out of the three image forming apparatuses, compare setting values of the reference image forming apparatus and the remaining image forming apparatuses in 1:N, and uniformly update the setting value of the reference image forming apparatus to the remaining image forming apparatuses. The remaining image forming apparatuses which are updated by the setting value of the reference image forming apparatus is called a comparison image forming apparatus.

A user may select an image forming apparatus group including a plurality of image forming apparatuses as a comparison image forming apparatus. The host apparatus 100 may equally update the setting value of the reference image forming apparatus to the image forming apparatus included in the selected image forming apparatus group.

Figure 9:
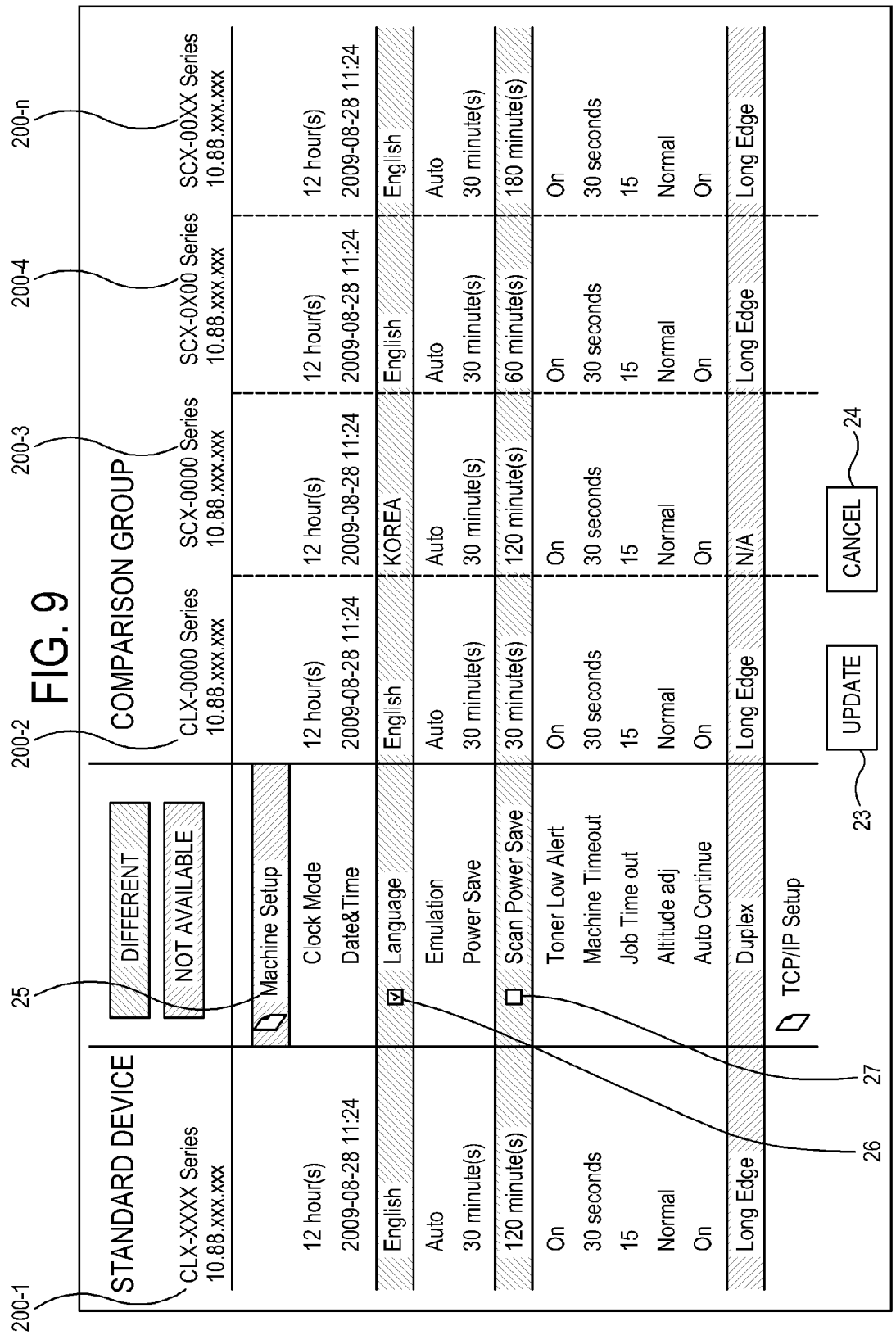
FIG. 9 illustrates a setting screen according to exemplary embodiments of the present general inventive concept.

FIG. 8 illustrates a control operation according to exemplary embodiments of the present general inventive concept. FIG. 9 illustrates a setting screen 20 according to the exemplary embodiments of the present general inventive concept.

In FIGS. 8 and 9, the first image forming apparatus 200-1 can be selected as the reference image forming apparatus and four image forming apparatuses 200-2, 200-3, 200-4 and 200-5 can be selected as the comparison image forming apparatus out of the plurality of image forming apparatuses 200-1, 200-2, . . . and 200-n.

A user may select the reference image forming apparatus (e.g., the first image forming apparatus 200-1), the comparison image forming apparatus (e.g., at least one of image forming apparatuses 200-2, 200-3, . . . , 200-N) and the setting item (e.g., setting values 25 illustrated in FIG. 9) by, for example, a drag and drop operation from the management screen 10 as in FIG. 5.

As illustrated in FIG. 8, the first controller 150 can request a configuration and can receive the configuration from the reference image forming apparatus 200-1 and the comparison image forming apparatus 200-2, 200-3, 200-4, and 200-5 corresponding to a user's selection.

The first controller 150 may receive the setting information corresponding to the level of a user (e.g., a general user, an administrator, etc.) who has logged into the host apparatus 100.

The first display unit 120 may separately display thereon the setting information, e.g., machine settings information received from the reference image forming apparatus 200-1 and the comparison image forming apparatus 200-2, 200-3, 200-4 and 200-5. The setting screen 20 may separately display the reference image forming apparatus 200-1 and the comparison image forming apparatus 200-2, 200-3, 200-4 and 200-5 in a reference area and a comparison area, respectively.

The first controller 150 compares configuration received from the reference image forming apparatus 200-1 and the comparison image forming apparatus 200-2, 200-3, 200-4 and 200-5, and controls the first display unit 120 to display difference according to the comparison result.

Referring to FIG. 9, the setting screen 20 may separately display when the reference image forming apparatus 200-1 and the comparison image forming apparatus 200-2, 200-3, 200-4 and 200-5 have the same setting value (e.g., setting values 25), when at least one of the comparison image forming apparatus 200-2, 200-3, 200-4 and 200-5 has a different setting value, and when the update is not available.

The setting screen 20 can include setting values 25, check boxes 26 and 27, an update button 23, and a cancel button as at least a portion of a UI to select whether to update the setting value of the comparison image forming apparatus 200-2, 200-3, 200-4 and 200-5.

A user may change the setting value (e.g., one of the values of the setting values 25, such as clock mode, date and time, language, emulation, power save, scan power save, toner low alert, machine timeout, job timeout, altitude adjustment, auto continue, duplex, etc.) of the comparison image forming apparatus 200-2, 200-3, 200-4 and 200-5, i.e., select settings to be updated as illustrated in FIG. 8 by using the UI of the setting screen 20 in FIG. 9 (e.g., by drag and drop operations, etc.).

For example, if the setting value of the language setting item of the reference image forming apparatus 200-1 is English when those of the comparison image forming apparatus 200-2, 200-3, 200-4 and 200-5 are Korea and French, a user may select the check box 26 and apply the setting value of the reference image forming apparatus 200-1 (i.e., English) to the comparison image forming apparatus 200-2, 200-3, 200-4 and 200-5.

The different setting value of the image forming apparatuses 200-3 and 200-5 can be updated to English selectively.

Even when the comparison image forming apparatus 200-2, 200-4 and 200-5 have different setting values (e.g., 30, 60 and 180 minutes) for a scan power save setting item with respect to the setting value of the reference image forming apparatus 200-1 (e.g., 120 minutes), a user may select not to change the setting value.

That is, a user and/or the image forming system 10 may determine whether setting values are the same through the setting screen 20 and determine whether to update the setting values.

The setting screen 20 may separately display whether the image forming apparatus supports a function such as a setting item duplex, i.e., whether the update is available. That is, if the setting value is not changed because of a functional difference between device models, the setting screen 20 may disable a corresponding check box.

If the update of the setting value is determined according to the selection of the check box 26, a user may select the update button 23 and update the comparison image forming apparatus 200-2, 200-3, 200-4 and 200-5 to apply the setting value of the reference image forming apparatus 200-1 to the comparison image forming apparatus 200-2, 200-3, 200-4 and 200-5.

The first controller 150 can control the first communication unit 140 to update a configuration of the reference image forming apparatus 200-1 and the comparison image forming apparatus 200-2, 200-3, 200-4 and 200-5 as in FIG. 6 corresponding to the update command according to a user's selection.

The first communication unit 140 may transmit the setting value to a corresponding image forming apparatus through a protocol such as SNMP or a file such as CSV and XML.

If a user determines to update the setting value for a plurality of setting items, the first controller 150 can update the setting value uniformly by transmitting the setting value corresponding to the plurality of setting items to the image forming apparatus simultaneously and update the plurality of comparison image forming apparatus.

The first controller 150 can receive status information representing the update result from the reference image forming apparatus 200-1 and the comparison image forming apparatus 200-2, 200-3, 200-4 and 200-5 through the first communication unit 140. The status information may include data representing acknowledgement of the installation or failure to install (e.g., "OK" or "Fail") the update.

The first controller 150 may control the first display unit 120 to notify a user of the update result through a text or graphic.

The image processor 160 can generate print data in a predetermined print language according to a print command through the first user interface unit 110. The generated print data can be transmitted to one of the plurality of image forming apparatuses 200-1, 200-2, . . . and 200-n through the first communication unit 140.

The image forming apparatuses 200-1, 200-2, . . . and 200-n can receive the print data from the host apparatus 100 and perform a print operation.

The image forming apparatuses 200-1, 200-2, . . . and 200-n can include a second storage unit 230 to store therein print data and setting information (e.g., for functions and/or operations) of the image forming apparatus, a second communication unit 240 to communicate with the host apparatus 100, a second controller 250 to control the image forming apparatus as a whole and an image forming unit 260 to perform a print operation according to received print data. The setting information can include a setting value to be set for a predetermined function through a user manipulator (e.g., a graphical user interface, one or more input selection devices, etc.) of the image forming apparatus 200-1. The second storage unit 230 may store therein status information of the image forming apparatus 200-1 (e.g., consumables information such as available toner and paper available (e.g., amount of paper available to print on in a particular size).

The second controller 260 can control the second communication unit 240 to transmit setting information of the image forming apparatuses 200-1, 200-2, . . . and 200-n to the host apparatus 100 or the image forming apparatus server 300.

As illustrated in FIG. 1, if the image forming apparatus server 300 can be separately provided, the image forming apparatus server 300 can receive setting information from the plurality of image forming apparatuses 200-1, 200-2, . . . and 200-n through a third communication unit 340.

The third controller 350 can store in a third storage unit 330 the setting information received from the plurality of image forming apparatuses 200-1, 200-2, . . . and 200-n.

The host apparatus 100 may be connected and/or communicatively coupled to the image forming apparatus server 300 through the first communication unit 140 and receive a setting value of the selected image forming apparatus therefrom.

The host apparatus 100 may transmit an update history of a setting value for the plurality of image forming apparatuses 200-1, 200-2, . . . and 200-n to the image forming apparatus server 300 through the first communication unit 140, and the image forming apparatus server 300 may store the received update history in the third storage unit 330.

The host apparatus 100 according to the present general inventive concept may simultaneously compare the setting value of the plurality of image forming apparatuses 200-1, 200-2, . . . and 200-n connected and/or communicatively coupled in a network, and selectively update the setting value, such that a user can manage the network image forming apparatuses more conveniently.

In the image forming system 10 as disclosed herein, a setting information management process of the host apparatus 100 will be described with reference to FIGS. 10 and 11.

Figure 10:
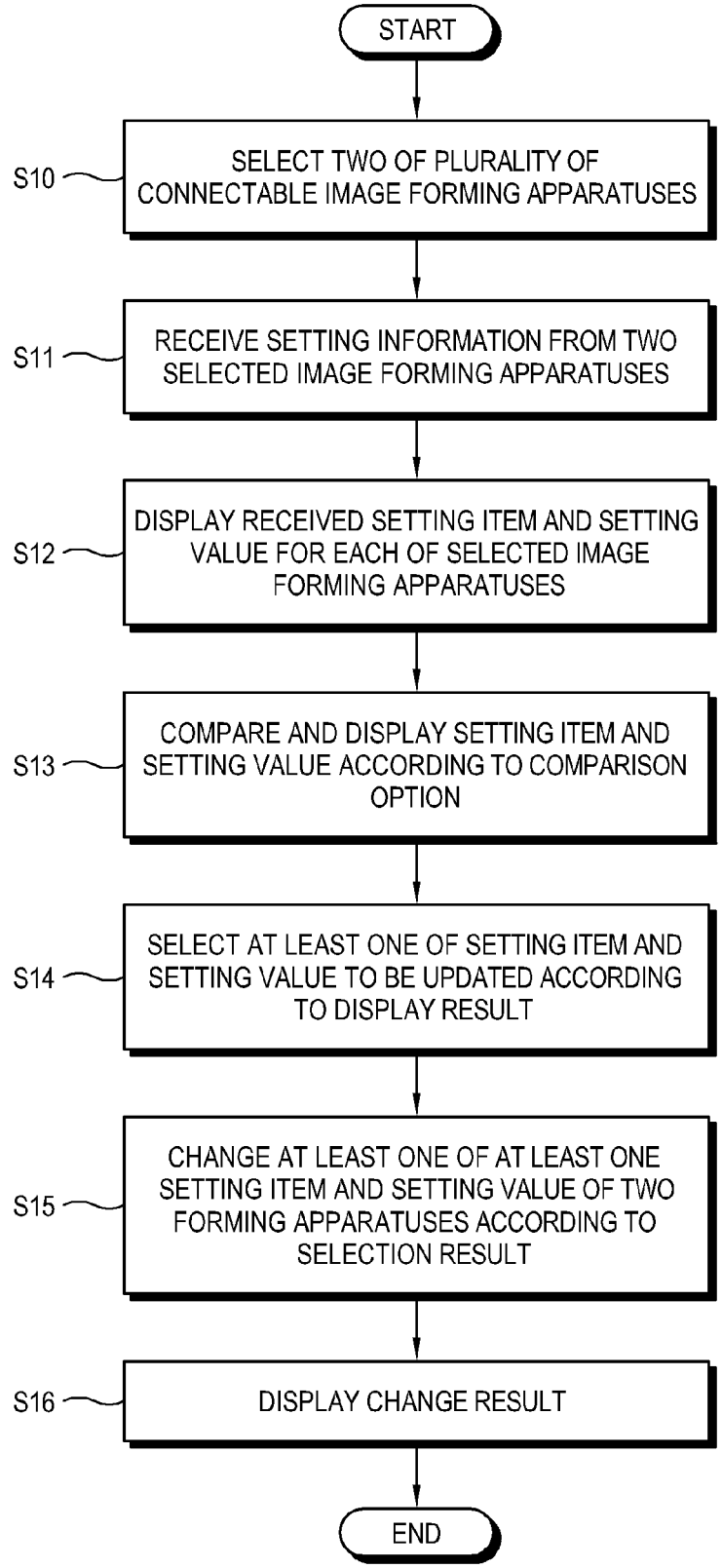
FIG. 10 is a flowchart illustrating a setting information management process according to exemplary embodiments of the present general inventive concept.

FIG. 10 is a flowchart of a setting information management process according to the exemplary embodiments of the present general inventive concept.

As illustrated therein, a user may select at least two image forming apparatuses 200-1 and 200-2 out of the plurality of image forming apparatuses 200-1, 200-2, . . . and 200-n to compare the setting information at operation S10.

The host apparatus 100 may receive at least one setting information from the selected image forming apparatuses 200-1 and 200-2 at operation S11. The setting information may include at least one setting item and a corresponding setting value. The setting information may include at least one of the address book, the setting information on the function of the image forming apparatus, and the network settings information.

The first controller 150 can control the first display unit 120 to separately display thereon the setting item and setting value received at operation S11 according to the selected image forming apparatuses 200-1 and 200-2 at operation S12. The first display unit 120 may display different setting items and setting values depending on the level of a user who logs in (administrator or general user).

The first controller 150 may control the first display unit 120 to compare and display thereon the setting item and the setting value according to the comparison option at operation S13. That is, the first display unit 120 may separately display when the image forming apparatuses 200-1 and 200-2 have the same setting value for the setting item, when the image forming apparatuses 200-1 and 200-2 have different setting values, and when one of the image forming apparatuses 200-1 and 200-2 does not have the setting value. If the two image forming apparatus have the same setting value for the setting item, the setting value may not be displayed or may be enabled or disabled depending on the update availability.

A user can select at least one of the setting item and the setting value of at least one of the image forming apparatus to be updated according to the display result at operation S14. A user may update the setting value of the first image forming apparatus 200-1 to the second image forming apparatus 200-2 through the setting screen 20 in FIG. 4 or 5, or update the setting value of the second image forming apparatus 200-2 to the first image forming apparatus 200-1. Even if the setting values of the setting item of the selected image forming apparatuses 200-1 and 200-2 are different, a user may not change the setting value.

The first controller 150 may change at least one of the setting item and the setting value of at least one of the two selected image forming apparatuses according to the selection result at operation S15. The first controller 150 may update the setting value of at least one setting item of an image forming apparatus to another image forming apparatus, uniformly change the setting value of a plurality of setting items and update the setting value for the selected image forming apparatuses.

The changing operation S15 can include an operation of transmitting the changed setting information to the corresponding image forming apparatus through the first communication unit 140. The first communication unit 140 may transmit the setting value through at least one of the SNMP protocol, the CSV file, and the XML file.

The first controller 150 may control the first display unit 120 to display thereon the change result (including OK/Failure message to acknowledge the installation of the selected update or the failure to install the selected update) at operation S15. The first controller 150 may transmit the change result to an administrator by email or others.

Figure 11:
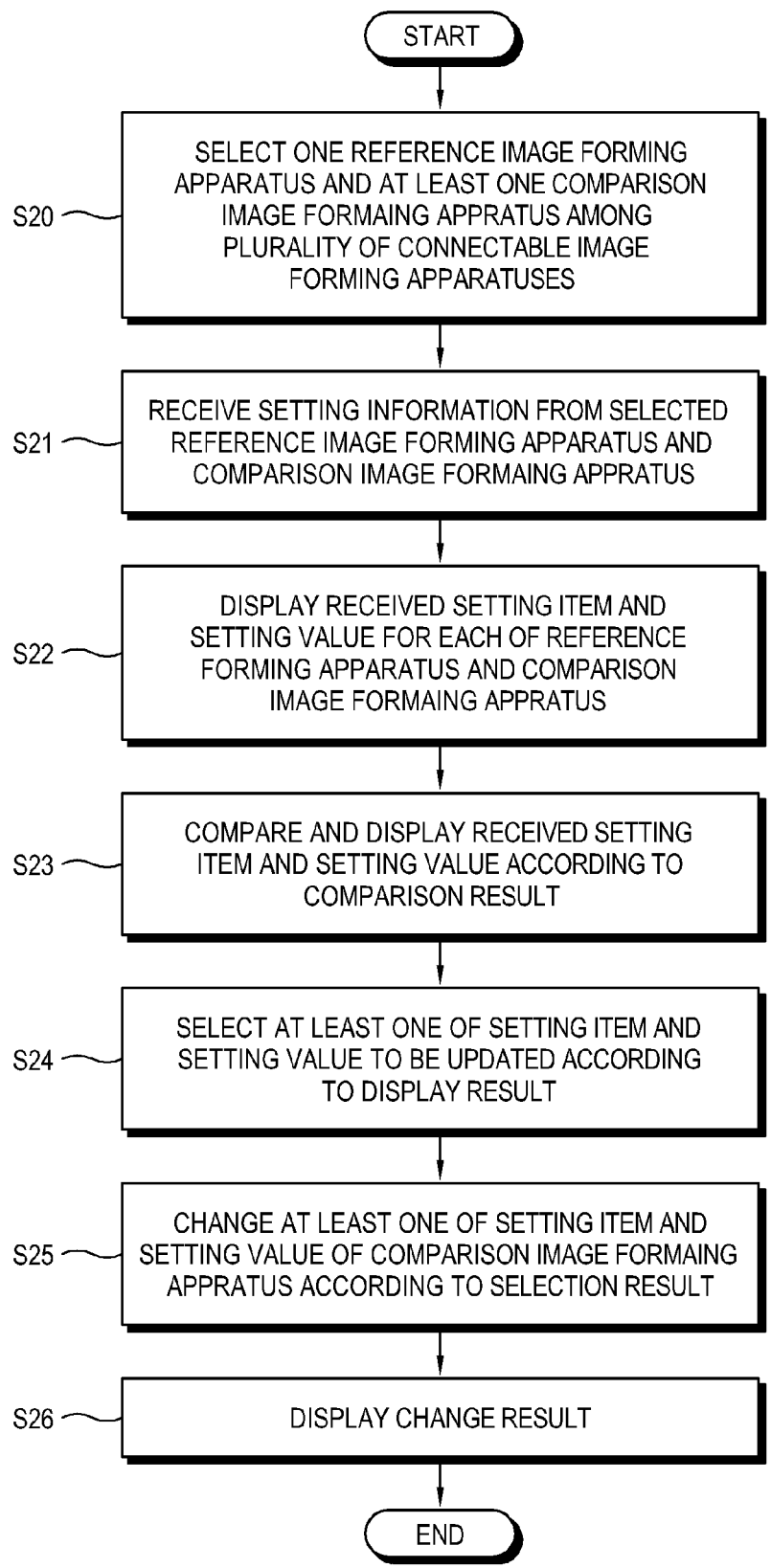
FIG. 11 is a flowchart illustrating a setting information management process according to exemplary embodiments of the present general inventive concept.

FIG. 11 is a flowchart illustrating a setting information management process according to exemplary embodiments of the present general inventive concept.

As illustrated therein, a user may select the reference image forming apparatus 200-1 and at least one comparison image forming apparatus 200-2, 200-3, 200-4 and 200-5 out of the plurality of image forming apparatuses 200-1, 200-2, ... and 200-*n* at operation S20. At least one comparison image forming apparatus may be included in a comparison group (e.g., an image forming apparatus group).

The host apparatus 100 may receive the setting information from the reference image forming apparatus 200-1 and at least one of the comparison image forming apparatus 200-2, 200-3, 200-4 and 200-5 at operation S21. The setting information can include at least one setting item and a setting value corresponding to the setting item. The setting information may include at least one of the address book, the setting information on the function of the image forming apparatus, and the network settings information.

The first controller 150 can control the first display unit 120 to separately display thereon the setting item and setting value received at operation S21 for each of the reference image forming apparatus 200-1, and the comparison image forming apparatus 200-2, 200-3, 200-4 and 200-5 at operation S22. The first display unit 120 may display different setting items and setting values depending on the level of a user who logs in (e.g., an administrator or a general user).

The first controller 150 may control the first display unit 120 to compare and display thereon the setting item and setting value according to the comparison option at operation S23. That is, the first display unit 120 may separately display thereon when the reference image forming apparatus 200-1 and the comparison image forming apparatus 200-2, 200-3, 200-4 and 200-5 have the same setting value for the setting item, when the reference image forming apparatus 200-1 and at least one of the comparison image forming apparatus 200-2, 200-3, 200-4 and 200-5 have different setting values and when one of the comparison image forming apparatus does not have the setting value. The setting item and the setting value which are the same between the reference image forming apparatus 200-1 and the comparison image forming apparatus 200-2, 200-3, 200-4 and 200-5 may not be displayed or may be enabled or disabled depending on the update availability.

A user can select at least one of the setting item and setting value of at least one of the comparison image forming apparatus 200-2, 200-3, 200-4 and 200-5 to be updated according to the display result at operation S24. Even if the setting values of the setting item of the comparison image forming apparatus 200-2, 200-3, 200-4 and 200-5 are different from that of the reference image forming apparatus 200-1, a user may not change the setting value.

The first controller 150 may change at least one of the setting item and the setting value of the comparison image forming apparatus 200-2, 200-3, 200-4 and 200-5 according to the selection result at operation S25. The first controller 150 may update the setting value of the reference image forming apparatus 200-1 to the comparison image forming apparatus 200-2, 200-3, 200-4 and 200-5 and uniformly update the setting value corresponding to a plurality of setting items.

The changing operation S25 can include an operation of transmitting the changed setting information to the corresponding image forming apparatus through the first communication unit 140. The first communication unit 140 may transmit the setting value through at least one of the SNMP protocol, the CSV file and the XML file.

The first controller 150 may control the first display unit 120 to display thereon the change result (e.g., including an OK and/or Failure message that the update has been installed or that the update has failed, respectively) at operation S25. The first controller 150 may transmit the change result to an administrator by email or others.

According to the exemplary embodiments of the present general inventive concept, the host apparatus 100 can uniformly compare the setting value of the plurality of image forming apparatuses 200-1, 200-2, ... and 200-*n*, can change the setting value selectively, and can enable a user to manage the network image forming apparatuses more conveniently.

As described above, a host apparatus connected and/or communicatively coupled to an image forming apparatus and a setting information management method thereof according to the present general inventive concept can compare and display setting information received from the host apparatus connected and/or communicatively coupled to the plurality of image forming apparatuses for each image forming apparatus, can determine whether to update a setting value depending on a display result, and can manage the setting information of the plurality of image forming apparatuses more efficiently and conveniently.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A setting information management method of a host apparatus which is communicatively coupled to a plurality of image forming apparatuses that include setting information, the method comprising:
   selecting at least two image forming apparatuses out of the plurality of image forming apparatuses;
   receiving at least one setting item and a setting value corresponding to the at least one setting item of the setting information from the selected at least two image forming apparatuses;
   displaying the at least one received setting item and setting value for each of the selected at least two image forming apparatuses;
   comparing and displaying the at least one setting item and setting value of the selected at least two image forming apparatuses according to a comparison option, with the comparison option being at least one of left exist only, right exist only, exist only in one of a comparison image forming apparatus, and not available;
   selecting at least one of the displayed at least one setting item and setting value to be updated;
   changing at least one of the setting item and the setting value of at least one of the selected image forming apparatuses corresponding to the at least one selected setting item and setting value;
   storing setting information which includes at least one of the changed setting item and setting value; and
   transmitting the stored setting information to a corresponding image forming apparatus of the selected at least two image forming apparatuses,
   wherein the selecting the at least two image forming apparatuses comprises selecting a reference image forming apparatus and at least one comparison image forming apparatus, and the changing comprises automatically updating at least one of a setting item and a setting value of the reference image forming apparatus when the at least one of the setting item and the setting value of the comparison image forming apparatus is changed, and
   wherein the setting information includes an address book, setting information on a function of the image forming apparatus, network settings information, and security setting information.

2. The method according to claim 1, wherein the comparison option further includes at least one of a same and partially different.

3. The method according to claim 2, wherein at least one of the setting item and setting value of the selected at least two image forming apparatuses is separately displayed according to the comparison option.

4. The method according to claim 1, wherein the selecting at least one of the setting item and setting value comprises:
   selecting at least one of the setting item and setting value by a received drag and drop input.

5. The method according to claim 1, wherein one of the selected at least two image forming apparatuses is included in an image forming apparatus group having at least one image forming apparatus.

6. The method according to claim 1, wherein the comparing and displaying comprises:
   not displaying a setting item and a setting value which are the same between the at least two selected image forming apparatuses.

7. The method according to claim 1, wherein the comparing and displaying comprises:
   separately displaying at least one of the setting item and the setting value according to an update availability of the setting value.

8. The method according to claim 1, further comprising:
   logging in by a user,
   wherein the displaying for each of the image forming apparatuses comprises displaying a setting item and a setting value corresponding to a level of a user who logs in.

9. The method according to claim 1, wherein the transmitting the setting information comprises:
   transmitting the setting information by using at least one of a simple network management protocol (SNMP), a comma separated value (CSV) file, and an extensible markup language (XML) file.

10. A host apparatus which is communicatively coupled to a plurality of image forming apparatuses that include setting information, the host apparatus comprising:
   a user interface unit to select at least two image forming apparatuses out of the plurality of image forming apparatuses, the at least two image forming apparatus including a reference image forming apparatus and at least one comparison image forming apparatus, and to select at least one of a setting item and a setting value of setting information of the selected at least two image forming apparatuses;
   a communication unit to communicate with the plurality of image forming apparatuses and to receive at least one setting item and at least one setting value corresponding to the setting item from the selected at least two image forming apparatuses;
   a display unit to display thereon at least one received setting item and the setting value for each of the selected at least two image forming apparatuses; and
   a controller to control the display unit to compare and display thereon at least one setting item and at least one setting value, which is setting information, of the selected at least two image forming apparatuses according to a comparison option, with the comparison option being at least one of left exist only, right exist only, exist only in one of a comparison image forming apparatus, and not available, to receive a selection of the displayed setting item and setting value of the setting information to be updated through the user interface unit according to the display result, to control the communication unit to transmit a command to change at least one of the setting item and setting value of the setting information of at least one of the selected at least two image forming apparatuses corresponding to the at least one selected setting item and setting value of the setting information, and to automatically update at least one of a setting item and a setting value of the setting information of the reference image forming apparatus when the at least one of the setting item and the setting value of the setting information of the comparison image forming apparatus is changed, the setting information including an address book, setting information on a function of the image forming apparatus, network settings information, and security setting information.

11. The host apparatus according to claim 10, wherein the comparison option further includes at least one of a same and partially different.

12. The host apparatus according to claim 11, wherein the display unit separately displays thereon at least one of the setting item and setting value of the selected at least two image forming apparatuses according to the comparison option.

13. The host apparatus according to claim 10, wherein the user interface unit receives a selection of at least one of the setting item and setting value by a received drag and drop input.

14. The host apparatus according to claim 10, wherein one of the at least two selected image forming apparatuses is included in an image forming apparatus group having at least one image forming apparatus.

15. The host apparatus according to claim 10, wherein the display unit does not display thereon a setting item and a setting value which are the same between the at least two selected image forming apparatuses.

16. The host apparatus according to claim 10, wherein the display unit separately displays thereon at least one of the setting item and setting value depending on an update availability of the setting value.

17. The host apparatus according to claim 10, wherein the user interface unit receives an input of an ID and password for a user log-in, and the controller determines a level of a user who logs in, and controls the display unit to display thereon a setting item and a setting value corresponding to the determined user level.

18. A host apparatus communicatively coupled to a plurality of image forming apparatuses that include setting information, the host apparatus comprising:
  an interface unit to receiving a selection of two image forming apparatuses from the plurality of image forming apparatuses, the selected two image forming apparatus including a reference image forming apparatus and at least one comparison image forming apparatus, and to receive at least one setting item and a setting value corresponding to the setting information from the selected two image forming apparatuses; and
  a controller to compare the at least one setting item and setting value of the selected two image forming apparatuses according to a comparison option which is at least one of left exist only, right exist only, exist only in one of a comparison image forming apparatus, and not available, to change at least one of the setting item and the setting value of at least one of the selected two image forming apparatuses, to automatically update at least one of a setting item and a setting value of the reference image forming apparatus when the at least one of the setting item and the setting value of the comparison image forming apparatus is changed, to store setting information which includes the at least one of the changed setting item and the setting value, and to transmit the stored setting information to a corresponding image forming apparatus of the selected at least two image forming apparatuses, the setting information including an address book, setting information on a function of the image forming apparatus, network settings information, and security setting information.

19. The host apparatus of claim 18, further comprising:
  a display to display the changed setting item and setting value of the at least one of the selected two image forming apparatuses.

20. A method of managing setting information of a host apparatus which is communicatively coupled to a plurality of image forming apparatuses that include setting information, the method comprising:
  receiving a selection of two image forming apparatuses from the plurality of image forming apparatuses;
  receiving at least one setting item and a setting value corresponding to the setting information from the selected two image forming apparatuses;
  comparing the at least one setting item and setting value of the selected two image forming apparatuses according to a comparison option which is at least one of left exist only, right exist only, exist only in one of a comparison image forming apparatus, and not available;
  receiving a selection of at least one setting item and setting value determined by the comparison to be updated according to the comparison;
  changing at least one of the setting item and the setting value of at least one of the selected two image forming apparatuses;
  storing setting information which includes at least one of the changed setting item and setting value; and
  transmitting the stored setting information to a corresponding image forming apparatus of the selected at least two image forming apparatuses,
  wherein the receiving a selection of the two image forming apparatuses comprises receiving a selection of a reference image forming apparatus and at least one comparison image forming apparatus, and the changing comprises automatically updating at least one of a setting item and a setting value of the reference image forming apparatus when the at least one of the setting item and the setting value of the comparison image forming apparatus is changed, and
  wherein the setting information including an address book, setting information on a function of the image forming apparatus, network settings information, and security setting information.

21. The method of claim 20, further comprising:
  displaying the result of the comparing the at least one setting item and setting value of the selected two image forming apparatuses with a display coupled to the host apparatus.

22. The method of claim 20, further comprising:
  displaying the changed at least one of the setting item and the setting value of at least one of the selected two image forming apparatuses.

* * * * *